US007494682B2

(12) United States Patent
Jennings

(10) Patent No.: US 7,494,682 B2
(45) Date of Patent: Feb. 24, 2009

(54) RELEASE AGENT AND METHOD FOR USE IN BAKING APPLICATIONS

(76) Inventor: Dennis Richard Jennings, PO Box 628, Pennington 4184 (ZA)

( * ) Notice: Subject to any disclaimer, the term of this patent is extended or adjusted under 35 U.S.C. 154(b) by 0 days.

(21) Appl. No.: 11/473,286

(22) Filed: Jun. 22, 2006

(65) Prior Publication Data

US 2007/0065566 A1    Mar. 22, 2007

Related U.S. Application Data

(63) Continuation-in-part of application No. 10/620,678, filed on Jul. 16, 2003, now abandoned.

(30) Foreign Application Priority Data

Jul. 19, 2002    (ZA) ................................. 2002/5796

(51) Int. Cl.
    *A23D 9/007*    (2006.01)
(52) U.S. Cl. ........................... 426/609; 426/811; 106/8; 106/287.1; 106/9
(58) Field of Classification Search ................ 426/609, 426/811; 106/287.1, 8, 9
    See application file for complete search history.

(56) References Cited

U.S. PATENT DOCUMENTS

| | | | |
|---|---|---|---|
| 3,892,881 A | | 7/1975 | Lissant |
| 3,906,117 A | | 9/1975 | Gawrilow |
| 4,045,589 A | * | 8/1977 | Petrowski et al. ........... 426/609 |
| 4,155,770 A | | 5/1979 | Doumani |
| 4,264,586 A | | 4/1981 | Callingham |
| 4,378,389 A | | 3/1983 | Maruyama |
| 4,436,007 A | | 3/1984 | Russon |
| 4,547,388 A | | 10/1985 | Stross |
| 4,847,068 A | * | 7/1989 | Dole et al. ..................... 424/47 |
| 5,096,617 A | * | 3/1992 | Ball et al. ..................... 516/116 |
| 5,156,876 A | * | 10/1992 | Clapp et al. .................. 426/609 |
| 5,374,434 A | * | 12/1994 | Clapp et al. .................. 426/116 |
| 5,436,007 A | * | 7/1995 | Hartung et al. .............. 424/402 |
| 5,503,866 A | * | 4/1996 | Wilhelm, Jr. ................. 426/609 |
| 5,662,956 A | | 9/1997 | Knightly |
| 6,162,290 A | * | 12/2000 | Schneider et al. ........ 106/38.22 |
| 6,210,743 B1 | | 4/2001 | Clapp |
| 6,365,211 B1 | * | 4/2002 | Corrigan ..................... 426/116 |

OTHER PUBLICATIONS

Jay, James. 1978. Modern Food Microbiology, 2nd edition. D. Van Nostrand, New York, p. 11-13 & 38.*

* cited by examiner

*Primary Examiner*—Carolyn Paden
(74) *Attorney, Agent, or Firm*—J. Wiley Horton

(57) ABSTRACT

A method for making a release agent suitable for use in the baking industry, along with examples of the release agent made according to the method. The method comprises heating a food grade oil to between about 100 and about 130 degrees Celsius, then adding water heated to near its boiling point. Agitation is used during the process to convert the mixture to a stable oil-in-water emulsion. A relatively small volume of emulsifying agent may also be added. The preferred embodiment uses a silicone oil, which leaves very little solid residue on the baking pans.

20 Claims, 1 Drawing Sheet

RELEASE AGENT AND METHOD FOR USE IN BAKING APPLICATIONS

CROSS-REFERENCES TO RELATED APPLICATIONS

This application is a Continuation-in Part of U.S. Application Ser. No. 10/620,678, filed Jul. 16, 2003 now abandoned. The parent application listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of baking. More specifically, the invention comprises a method for making a composition for releasing baked products from baking pans, along with the composition made by the method.

2. Description of the Related Art

Industrial baking operations involve the repeated use of a set of baking pans. These pans may go through many baking cycles per day. Release agents have been used for many years to enable the easy extraction of the bread from the pans.

Baking release agents must be safe for human consumption, since some of the agent will inevitably be present in the food being baked. Thus, many prior art release agents have used edible oils. Edible oils, typically vegetable oils, have been used in this role for many years. Examples are soybean oil, corn oil, sunflower oil, olive oil, peanut oil, safflower oil, cottonseed oil, and palm oil. Glycerides, as well as other animal fat derivatives, are often included.

The edible oil is generally mixed with water prior to spraying or painting the composition onto the baking pans. A typical composition includes (by volume) about 30% edible oil and about 3% emulsifiers, with the balance being water. These components are typically mixed under ambient conditions (about 25 degrees Celsius). However, under some circumstances they may be mixed at mildly elevated temperatures of approximately 60 degrees Celsius.

The percentages vary according to market requirements and desired shelf life. The prior art formulations have limited stability, meaning that the oil and water will separate over time. They are referred to as an "emulsion," but are in reality more accurately deemed a water-in-oil suspension. The stability of the suspension is limited. Thus, the selection of the percentages may depend in part on how long the product must be stored prior to use.

The selection of the appropriate edible oil is driven in part by market forces, including local availability. Well-refined cotton seed oil is cleaner burning than badly refined sunflower oil, but the price difference may nevertheless favor the sunflower oil.

Mixing in more water increases the viscosity of the prior art formulations, but not the stability. Adequate stability can be achieved by adding the correct type and percentage of emulsifier. However, a certain amount of stability is gained past a certain concentration point due to the viscosity itself, as the molecules that are not linked by the emulsifier cannot float apart.

A highly viscous product eventually becomes too thick to spray. It can be thinned of course, but adding more water will eventually result in far too few links between the molecules and the viscosity will actually decrease, resulting in a low viscosity product with no stability and extremely poor release properties. Once the initial mixing is complete, it is very difficult to add more water to the prior art formulations.

Thus, the baking release agent is typically manufactured in the form in which it will ultimately be applied to the baking pans. The release agent is not made as a "concentrate" designed to be diluted prior to use. The prior art formulations contain about ⅔ water by volume. A purchaser buying such products is paying to transport a large volume (and weight) of water. A large portion of the storage volume is obviously also consumed by the water. It would be desirable to provide a release agent which could be "cut" with water in the bakery just prior to its use. This would result in a substantial reduction in transportation and storage costs.

There is a second inherent problem in the prior art formulations. All the organic oils discussed (cotton seed oil, sunflower oil, etc.) contain a significant amount of carbon. Residual carbon tends to accumulate on the pans over the baking cycles. Vegetable oils undergo significant oxidation and solid deposition at around 180 degrees Celsius. The average baking oven temperature is around 250 degrees Celsius. Thus, carbon fouling is a given in current baking operations.

This carbon fouling becomes a significant problem, as it is quite difficult to remove. Anyone who has cleaned a household bread baking pan is familiar with the problem of carbon deposits. They must often be scraped off in a very laborious fashion.

One solution is simply to discard a set of pans once the carbon deposition becomes significant. As several hundred or several thousand pans may comprise the set, this solution is unsatisfactory. A second solution is to pull the pans out of service and clean them. This option often requires the use of toxic chemicals, such as carbon tetrachloride. Such cleaning operations must generally be conducted in a separate facility equipped to handle such chemicals. Thus, the pan set must be shipped away and taken out of service for days if not weeks. This fact necessitates the use of two or three pan sets for a single baking line. The use of carbon-depositing pan release agents is therefore problematic.

The present invention seeks to address these concerns with the prior art formulations by providing a release agent which (1) can be diluted with additional water just prior to its use; and (2) significantly reduces deposits on the baking pans.

BRIEF SUMMARY OF THE INVENTION

The present invention comprises a method for making a release agent suitable for use in the baking industry. The method creates a stable true emulsion using a food grade oil, water, and preferably an additional emulsifying agent. Additional water can be added to the stable emulsion prior to its application to the baking pans.

The method of making the release agent comprises heating the food grade oil to between about 100 and about 130 degrees Celsius, then adding water which is at or near its boiling point. Agitation is used during the process to create a stable oil-in-water emulsion. A relatively small volume of emulsifying agent may also be added.

While the method can be used with many prior art food grade oils, the preferred embodiment uses a silicone oil. Because the silicone oil has a relatively high oxidation temperature, its use substantially reduces the amount of solid deposits on the baking pans. The novel method of manufacturing the emulsion allows a relatively small volume of silicone oil to be used, minimizing cost and ensuring food safety.

The novel method produces a low viscosity product having good stability and release properties. The method reduces the molecular size which allows better cross linking with less oil and emulsifiers. The smaller molecular size also gives a smooth crust on the baked goods by reducing pit craters formed when the air in the prior art dispersant expands at baking temperatures.

REFERENCE NUMERALS IN THE DRAWINGS

Figure 1:
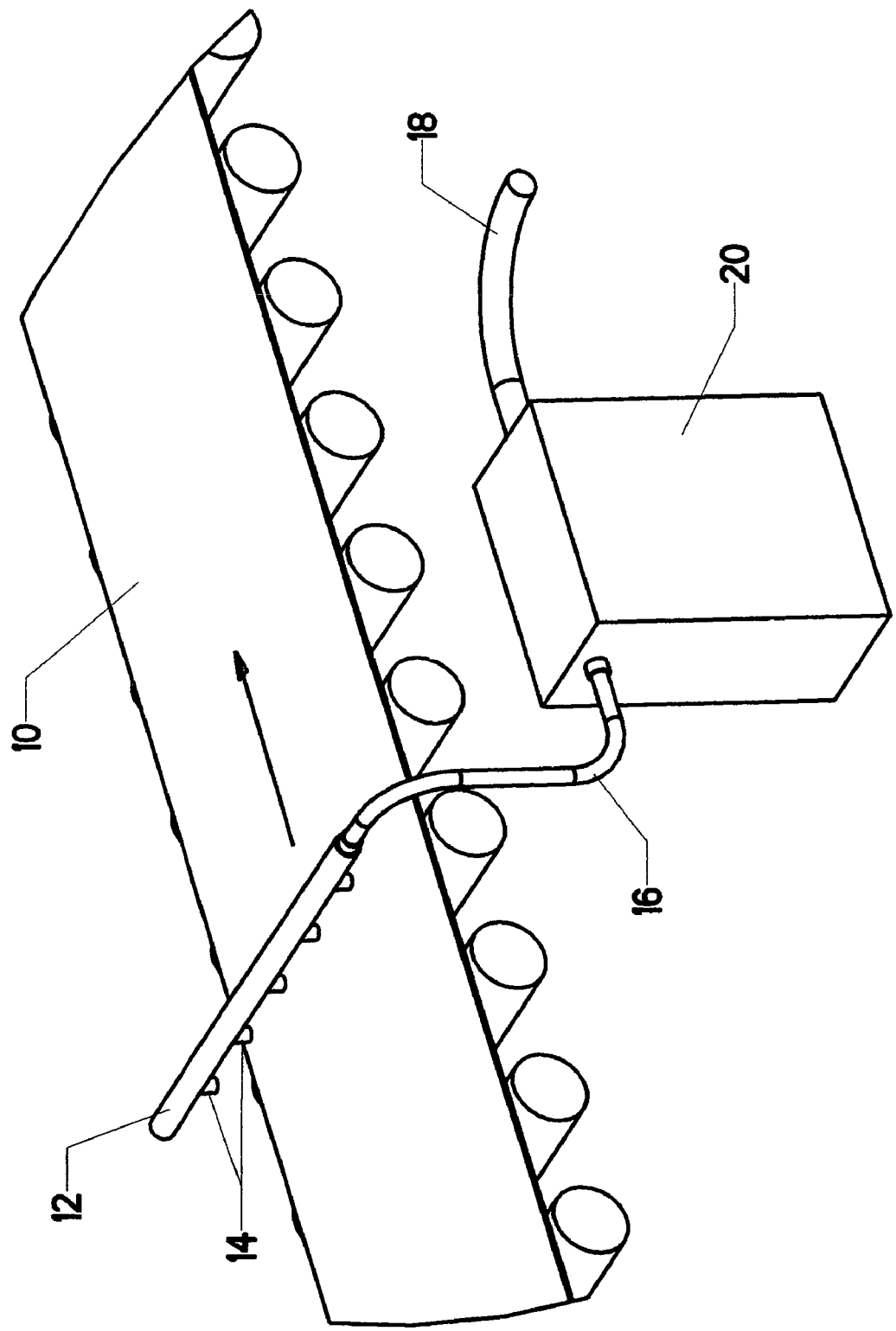
FIG. 1 is a perspective view, showing one method of applying the present invention.

| 10 | conveyor belt | 12 | dispensing manifold |
| 14 | nozzle | 16 | output line |
| 18 | input line | 20 | controller |

DESCRIPTION OF THE INVENTION

The method disclosed herein can be used to make a release agent for many different applications. The preferred embodiment, however, is formulated for the bread baking industry. The bread baking industry will therefore be used for the examples.

Those skilled in the art will be familiar with the terms "dispersant" and "emulsion." However, a brief explanation of these terms may be helpful. A water-in-oil dispersant exists when the water molecule is surrounded by oil and is not compatible with the surrounding water. A good example is adding a few drops of oil to the top of a body of water. The drops can be forced to disperse throughout the water by a high speed mixer. However, once the mixing ceases, the oil will quickly separate.

An oil-in-water emulsion is formed when the oil molecules are surrounded by water molecules, so that the exterior of the combination is compatible with other water molecules. To achieve a stable emulsion, the size of the molecular clusters should be reduced as much as possible. Such a composition will freely mix with a body of water without any agitation and will remain stable.

The present release agent is fundamentally a true emulsion of food grade oil in water. An emulsifying agent is preferably used to assist in the formation of the emulsion, as well as stabilizing the emulsion so that the release agent can be stored for extended periods. The release agent is formed by heating the food grade oil to a temperature of about 100° C. to about 130° C. Water which is at or near its boiling point is added to the oil while a high shear mixer stirs the ingredients together. The mixing continues for a sufficient time to create a stable oil-in-water emulsion.

The reaction to convert from a water-in-oil dispersant to a stable oil-in-water emulsion takes place as the water is added to the boiling oil. A first volume of water—typically 5 to 10 liters—is heated as close as possible to its boiling point in order to make the reaction less violent. This heated water is preferably injected into the mixer rather than being poured in.

Next, a second volume of water is added at a lower temperature. This second volume is preferably near ambient conditions, so that when it is added the emulsion will drop below 40 degrees Celsius. The reduced temperature increases stability and allows the emulsion to be placed in standard commercial containers (typically plastic).

The mixing time depends upon the size of the batch and the rate at which the water can be added. About 225 liters can be completed in approximately 10 minutes.

The addition of the water to the oil is a significant feature of the present invention. An oil-in-water emulsion can be created by mixing the oil phase into the water. However, the stability of the emulsion using that approach is quite poor. There are existing surfactants which can improve the stability, but these chemicals are not suitable for human consumption and cannot be used in the baking industry. Thus, the order of operations is significant and the water is preferably added to the oil phase, rather than the other way around.

A suitable food grade emulsifier can be added to the present composition to further improve it. Mixing the constituents at a controlled and elevated temperature is important. The resulting emulsion is allowed to cool to room temperature. It can then be placed in containers for storage.

Suitable food grade oils include various vegetable oils and silicone oils. While many prior art emulsifiers can be used, one particularly suitable emulsifier is sorbitan monostearate (having the trade name "CRILL"). Another suitable emulsifier is hydrogenated castor oil (having the trade name "CRODURET").

Industrial baking contemplates the use of large volumes of release agent. Thus, it is desirable to provide the release agent in concentrated form in order to minimize shipping costs. The concentrated form can be shipped to the baking facility. It is then diluted by adding a considerable volume of additional water prior to use. The "concentrate" is preferably formulated so that only additional water is needed to create the diluted "ready to use" form.

Because the concentrate is a true emulsion, additional water can be added without causing the constituents to separate. The stability of the emulsion is not threatened by changes in the volume percentages, so long as the changes are not carried to an extreme. The emulsion can be mixed with additional water in a volumetric ratio of 1 part emulsion to 1 part additional water, all the way up to about 1 part emulsion to 8 parts additional water. Thus, the release agent can be stored in "concentrated" form, then diluted to an appropriate concentration for use at the baking facility.

As discussed previously, the innovative method for creating the emulsion can be used with many different food grade oils. However, because of the problem of pan deposition with carbon-containing oils, the preferred embodiment uses a silicone oil. The normal drawbacks of using a silicone oil are the high cost of the base product, the difficulty of creating a stable emulsion suspension using silicone oil, and the maximum silicone oil concentration limit for food products recommended by the Food and Drug Administration. The present inventive process overcomes these known disadvantages by creating an effective release agent using a relatively low concentration of silicone oil.

Any food grade silicone oil having reasonable high temperature stability is suitable. One can select a suitable silicone oil on the basis of its mechanical properties, such as viscosity. The viscosity is largely a function of the average length of the polymer chains found within the oil. One particularly suitable silicone oil is "BAYSILONE" manufactured by General Electric-Bayer Corp. It is a polydimethylsiloxane having a density of about 0.97 grams per cubic centimeter and a viscosity of about 350 millimeters squared per second. This material has a flash point of about 315 degrees Celsius, making it ideal for baking applications.

The diluted release agent can be sprayed on the baking pans as for the prior art release agents. However, because it does not tend to form any significant gummy residue, it can also be applied by other methods. As one example, it can be applied to the belt which carries the bread dough to the baking pans. FIG. 1 is a simplified representation of this process. Conveyor belt 10 moves in the direction indicated by the arrow. Bread dough is transported by this conveyor belt. Input line 18 is connected to a supply of the diluted release agent. Controller 20 regulates the flow of release agent. It supplies the appropriate amount of release agent through output line 16 to dispensing manifold 12. Dispensing manifold 12 mounts a series of nozzles 14, which are directed toward conveyor belt 10.

Controller 20 can assume many forms. In the modern industrial context, it is likely to be a programmable logic controller running software directing its activity. It can be set to regulate the flow of release agent according to the throughput of dough, as well as other conditions such as temperature, humidity, etc. At the appropriate interval, it switches on the flow of release agent. An appropriate volume is then sprayed onto conveyor belt 10. As the dough moves along the conveyor, the release agent tends to coat the external surfaces of the dough. The dough is then deposited in the baking pans with the release agent already applied. Thus, there is no need to coat the pans themselves.

Those skilled in the art will realize that the apparatus shown in FIG. 1 can be configured to apply the release agent in many ways. As a second example, optical sensors could be used to sense the passage of bread dough beneath dispensing manifold 12. The release agent could then be sprayed directly on the dough itself.

Spray nozzles are only one convenient known method of application. A higher viscosity (i.e., more concentrated) version of the release agent could be controllably dripped onto the belt or the dough itself. Thus, the actual application hardware is not critical.

The release agent has some mild adhesive properties. This can be useful for affixing supplementary edible objects to the bread dough, such as sesame seeds, wheat grains, and the like. Thus, once the dough is deposited in the pans—or even before—a secondary operation can add the supplementary edible objects.

Specific formulations of the proposed release agent and the method for making those formulations will now be discussed in detail.

EXAMPLE 1

This example involves the creation of a true emulsion "concentrate" suitable for transportation and extended storage. This "concentrate" is designed to be diluted with additional water to create a ready-to-use "release agent."

Silicone oil (polydimethysiloxane) was heated to between about 100° C. and about 130° C. Water at or near its boiling point was then added, while the temperature of the mixture was maintained between about 100° C. and about 130° C. A high shear mixer was used through the addition of the water in order to keep the mixture under control. Sorbitan monostearate was added as an emulsifying agent. The mechanical agitation was continued long enough to convert the water-in-oil dispersant (the initial state of the boiling water as it is added) to a stable oil-in-water emulsion. The time required to complete this process ranges from about 5 to about 15 minutes.

The constituents of the "concentrate" formula, stated on the basis of percentage of total volume, were as follows:

| | |
|---|---|
| Silicone oil | 19% |
| Sorbitan monostearate | 1-2% |
| Water | 79-81% |

A stable emulsion was formed that could be stored at ambient temperature for an extended period. The concentrated formulation contains enough emulsifier to permit the addition of diluting water without destabilizing the emulsion. Thus, in this example, approximately four parts of additional water were added to each original part of water to create a diluted form which is then ready for use as a release agent. Mechanical agitation is optionally used during the dilution process. The dilution can be carried out under ambient conditions, so no special equipment is needed.

The constituents of the diluted formula, stated on the basis of percentage of total volume, were as follows:

| | |
|---|---|
| Silicone oil | 4% |
| Sorbitan monostearate | .2-.5% |
| Water | 91-96% |

This diluted formula was effective as a pan release agent, while producing greatly reduced residue in the pans. The reader should note that while boiling water is preferable (with the temperature being determined by the ambient pressure) very hot water nearing the boiling point can also be used in all the examples given.

EXAMPLE 2

A concentrate was created according to the steps detailed in EXAMPLE 1, but more silicone oil was used. The constituents of the concentrate, stated on the basis of percentage of total volume, were as follows:

| | |
|---|---|
| Silicone oil | 32% |
| Sorbitan monostearate | 1-2% |
| Water | 64-65% |

A stable emulsion was again formed. A diluted formula suitable for use as a release agent was then created by cutting 1 part concentrate with approximately 5 parts additional water (stated on a volumetric basis) The diluted formulation then had the following constituents, stated on the basis of percentage of total volume:

| | |
|---|---|
| Silicone oil | 6.7% |
| Sorbitan monostearate | .2-.5% |
| Water | 92-93% |

This diluted formula was likewise effective as a pan release agent.

EXAMPLE 3

Certain vegetable oil coatings have traditionally been used to form a desirable crust on the surface of the baked bread (as well as desirable colors, flavors, etc.). As described previously, these vegetable oils, if used in quantities sufficient to act as a pan release agent, tend to cause carbon fouling in the pans. However, such oils can be added to the silicone oil-based release agent in much lower amounts in order to provide the desired bread characteristics without substantial fouling. One such desirable vegetable oil (among many candidates) is sunflower oil. Accordingly, a concentrated formulation was created according to the process explained in EXAMPLE 1 having the following formula, stated on the basis of percentage of total mass:

| | |
|---|---|
| Silicone oil | 20.7% |
| Sunflower oil | 8.3% |
| Emulsifier | 1.2% |
| Water | 69.8% |

The sunflower oil was heated to the same temperature as the silicone oil and mixed with the silicone oil prior to adding the boiling water.

A diluted formulation was then created, having the following formula on the basis of percentage of total mass:

| | |
|---|---|
| Silicone oil | 5.5% |
| Sunflower oil | 2.2% |
| Emulsifier | .3% |
| Water | 92% |

This formulation was effective as a low-residue pan release agent, while imparting the desired characteristics to the baked bread.

EXAMPLE 4

In some instances it may be desirable to use two or more emulsifiers. One emulsifier may be particularly suitable for use in water while a second emulsifier may be particularly suitable for use in the silicone oil. A set of such emulsifiers was used to create another formulation. Water and the "water emulsifier" were mixed and heated to the boiling point. Silicone oil and the "oil emulsifier" were mixed and heated to a temperature marginally higher than the boiling point of water. The two mixtures were then mixed with one another, including mechanical agitation. A resulting concentrated formulation was created as follows:

| | | |
|---|---|---|
| Water | 110 | liters |
| Silicone oil | 30 | liters |
| Water and oil emulsifiers | 3.5 | kg |
| Vegetable oil | 10 | liters |

Using emulsifiers with a typical specific gravity in the range of 1.1 to 1.3, the concentrated formulation can be restated as follows (with volumes and volumetric percentages being stated):

| | | |
|---|---|---|
| Water | 110 | liters (72%) |
| Silicone oil | 30 | liters (20%) |
| Water and oil emulsifiers | 2.77 | liters (2%) |
| Vegetable oil | 10 | liters (6%) |

The particular vegetable oil used was Sunflower oil. A diluted formulation was then created by adding approximately 3 to 5 parts water for each part water in the concentrated formulation. An effective pan release agent resulted.

Numerous other formulations are possible. In fact, all the oils and emulsifiers can be mixed together and taken up to an elevated temperature prior to mixing in the water. The mixing process is not complex. Although the examples given have used the preferred embodiment of silicone oil, the inventive process can be applied to other food grade oils as well. It was generally observed that as to the concentrated formula, the food grade oil should comprise between about 15% to about 30% of the total by volume. The water should comprise about 60% to about 85% of the total volume, while the emulsifier should comprise about 0.1% to about 5% of the total volume.

As to the diluted version, the food grade oil should comprise between about 2% to about 10% of the total volume. The water should comprise about 89% to about 97% of the total volume, while the emulsifier should comprise about 0.1% to about 5% of the total volume. If a vegetable oil is added to the preferred embodiment, it will generally take the place of a portion of the food grade silicone oil.

Those skilled in the art will know that different types of food grade oils could be mixed to form a suitable composition. As an example, white oil could be substituted for a portion of the silicone oil and vice-versa. Those skilled in the art will also know that many different vegetable oils could potentially be used in the formulation, including soybean oil, corn oil, olive oil, peanut oil, safflower oil, cottonseed oil, and palm oil. Many different known emulsifiers could also be used. Water is obviously the cheapest ingredient in the present formulation. It is therefore desirable to experiment with the dilution of the concentrated formula to find the optimum performance for each bakery line. The bakeries adopting the present invention will likely be converting from vegetable emulsion release agents. Such a conversion can be experimentally made as follows:

Stage 1—Use concentrated food grade oil formula.

Stage 2—Dilute with one part water for each part water in concentrate.

Stage 3—Dilute with two parts water for each part water in concentrate.

Stage 4—Dilute with three parts water for each part water in concentrate.

Stage 5—Dilute with four parts water for each part water in concentrate.

Testing is conducted at each stage to determine if the bread sticks to the pans. If any sticking occurs, then the operator must revert to the prior stage. In this fashion, the bakery operator can find just the right dilution level. Maximum permissible dilution is desirable from the standpoint of minimizing release agent cost and from the standpoint of minimizing residue. The less concentrated formulations obviously produce less residue.

The final pan release agent can typically be used in the range of 0.3 to 1 grams per loaf, as compared to about 1.5 grams per loaf for the prior art formulations. The low volume of silicone oil initially used—which is further diluted by the addition of water on site—produces a low silicone oil concentration in the final product (well within F.D.A. standards). The low volume also produce a low cost, since the expensive ingredient (silicone oil) is minimized.

The diluted product also has low viscosity, reducing the gum deposits which are typically encountered with prior art vegetable oil formulations. Inexpensive spray guns can be used to coat the pans. The appearance of the baked bread is also improved. The bread crust also gains enhanced moisture retention, which leads to longer shelf life for the bread. This is due to the fact that a true emulsion—as created by the present inventive method—has a smaller molecular size. The smaller molecular size reduces the expansion of the air in the water when it reaches the boiling point during the baking process. The result is a smoother and less porous bread crust.

The silicone oil product generally produces a cleaner working area throughout the bakery. It remains water soluble, meaning that overspray and spillage can be easily cleaned. Of course, the lack of carbon deposition on the baking pans remains the primary advantage.

Although the preceding description contains considerable detail, it should not be viewed as limiting the present invention but rather as providing examples of the preferred embodiments. As an example, the specific percentages given for the formulae could be varied anywhere within the broad ranges described. Thus, the scope of the present invention should be fixed by the following claims rather than by the specific examples presented.

Having described my invention, I claim:

1. A method for preventing baked items from sticking to baking pans comprising:
    a. heating a food grade silicone oil to a temperature between about 100 degrees Celsius and about 130 degrees Celsius;
    b. adding water to said food grade silicone oil;
    c. adding an emulsifier;
    d. mechanically agitating said mixture of said food grade silicone oil and said water and said emulsifier using a high shear mixer for a time sufficient to convert said mixture to a stable oil-in-water emulsion;
    e. diluting said stable oil-in-water emulsion by adding additional water so that the viscosity of said stable oil-in-water emulsion is reduced; and
    f. applying said stable oil-in-water emulsion to said baking pans.

2. A method as recited in claim 1, further comprising before applying said stable oil-in-water emulsion to said baking pans, allowing said oil-in-water emulsion to cool to room temperature then placing said oil-in-water emulsion in a container for storage.

3. A method as recited in claim 1, wherein said silicone oil is polydimethylsiloxane.

4. A method as recited in claim 2, further comprising before applying said stable oil-in-water emulsion to said baking pans, adding still more water to further dilute said oil-in-water emulsion.

5. A method as recited in claim 1, wherein:
    a. the volume of said silicone oil is in the range of about 15% to about 25% of the total volume of said emulsion;
    b. the volume of said water is in the range of about 65% to about 80% of the total volume of said emulsion; and
    c. the volume of said emulsifier is in the range of about 0.5% to about 2% of the total volume of said emulsion.

6. A method as recited in claim 5, further comprising mixing additional water into said emulsion so that:
    a. the volume of said silicone oil is in the range of about 4% to about 7% of the total volume of said emulsion;
    b. the volume of said water is in the range of about 90% to about 95% of the total volume of said emulsion; and
    c. the volume of said emulsifier is in the range of about 0.1% to about 1% of the total volume of said emulsion.

7. A method as recited in claim 1, further comprising adding a food grade vegetable oil to said stable oil-in-water emulsion.

8. A method as recited in claim 7, wherein said food grade vegetable oil is selected from the group consisting of sunflower oil, soybean oil, corn oil, olive oil, peanut oil, safflower oil, cottonseed oil, and palm oil.

9. A method for making a baking release agent concentrate, comprising:
    a. heating a food grade silicone oil to a temperature between about 100 degrees Celsius and about 130 degrees Celsius;
    b. heating a first volume of water to between about 95 degrees Celsius and about 100 degrees Celsius and adding said first volume of water into said food grade silicone oil;
    c. mechanically agitating said mixture of said food grade oil and said first volume of water for a time sufficient to convert said mixture to a stable oil-in-water emulsion;
    d. providing a second volume of water having a temperature between about 20 degrees Celsius and about 40 degrees Celsius; and
    e. while continuing said mechanical agitation, adding said second volume of water to said stable oil-in-water emulsion to reduce the temperature of said oil-in-water emulsion and increase the percentage by volume of water in said oil-in-water emulsion.

10. A method as recited in claim 9, further comprising adding an emulsifier.

11. A method as recited in claim 10, wherein said emulsifier is selected from the group consisting of sorbitan monostearate and hydrogenated castor oil.

12. A method as recited in claim 11, wherein:
    a. wherein the volume of said silicone oil is in the range of about 15% to about 25% of the total volume of said release agent;
    b. the total volume of said water is in the range of about 65% to about 80% of the total volume of said release agent; and
    c. the volume of said emulsifier is in the range of about 0.5% to about 2% of the total volume of said release agent.

13. A method as recited in claim 12, further comprising mixing additional water into said release agent so that:
    a. the volume of said silicone oil is in the range of about 4% to about 7% of the total volume of said release agent;
    b. the total volume of said water is in the range of about 90% to about 95% of the total volume of said release agent; and
    c. the volume of said emulsifier is in the range of about 0.1% to about 1% of the total volume of said release agent.

14. A method as recited in claim 11 further comprising adding a third volume of water to further increase the percentage by volume of water in said oil-in-water emulsion.

15. A method as recited in claim 10 further comprising adding a third volume of water to further increase the percentage by volume of water in said oil-in-water emulsion.

16. A method as recited in claim 9 further comprising adding a third volume of water to further increase the percentage by volume of water in said oil-in-water emulsion.

17. A method as recited in claim 9, further comprising allowing said oil-in-water emulsion to cool to room temperature then placing said oil-in-water emulsion in a container for storage.

18. A method as recited in claim 17, further comprising mixing said oil-in-water emulsion in said container with a third volume of water to form a diluted oil-in-water emulsion, then applying said diluted oil-in-water emulsion as a baking release agent.

19. A method as recited in claim 9, wherein said food grade silicone oil is polydimethylsiloxane.

20. A method as recited in claim 9, further comprising adding a food grade vegetable oil to said oil-in-water emulsion.

* * * * *